(12) United States Patent
Popovich

US006191876B1

(10) Patent No.: US 6,191,876 B1
(45) Date of Patent: *Feb. 20, 2001

(54) LIGHT DIFFUSION CONTROL BY ELECTRICALLY RECONFIGURABLE HOLOGRAPHIC OPTICAL ELEMENTS

(75) Inventor: Milan M. Popovich, Leicester (GB)

(73) Assignee: DigiLens, Inc., Sunnyvale, CA (US)

( * ) Notice: Under 35 U.S.C. 154(b), the term of this patent shall be extended for 0 days.

This patent is subject to a terminal disclaimer.

(21) Appl. No.: 09/351,049

(22) Filed: Jul. 9, 1999

Related U.S. Application Data

(60) Provisional application No. 60/104,471, filed on Oct. 16, 1998.

(51) Int. Cl.[7] .................................................. G02B 5/32

(52) U.S. Cl. .............................. 359/15; 359/22; 359/23; 359/24; 359/462; 349/201; 349/202; 353/7

(58) Field of Search ............................. 359/15, 22, 23, 359/24, 462, 464, 472; 349/201, 202; 348/40, 41; 353/7, 30, 31, 34

(56) References Cited

U.S. PATENT DOCUMENTS

| | | | |
|---|---|---|---|
| 4,372,639 | * 2/1983 | Johnson | 350/3.7 |
| 5,046,793 | 9/1991 | Hockley et al. | 359/12 |
| 5,528,402 | 6/1996 | Parker | 359/87 |
| 5,631,754 | * 5/1997 | Jannson | 359/15 |
| 5,731,853 | * 3/1998 | Taketomi | 349/15 |
| 5,745,203 | 4/1998 | Valliath et al. | 349/113 |
| 5,796,499 | 8/1998 | Wenyon | 359/15 |
| 5,801,793 | 9/1998 | Faris et al. | 349/5 |
| 5,825,448 | 10/1998 | Bos et al. | 349/128 |
| 5,831,698 | * 11/1998 | Depp | 349/64 |
| 5,880,861 | * 3/1999 | Nishida | 359/15 |
| 5,999,281 | * 12/1999 | Abbott | 359/15 |
| 6,040,928 | * 3/2000 | Popovich | 359/15 |

FOREIGN PATENT DOCUMENTS

| | | | |
|---|---|---|---|
| WO97/35223 | 9/1997 | (WO) | G02B/27/01 |
| WO98/04650 | 2/1998 | (WO) | C09K/19/00 |

* cited by examiner

*Primary Examiner*—Cassandra Spyrou
*Assistant Examiner*—Leo Boutsikaris
(74) *Attorney, Agent, or Firm*—Law Offices of Terry McHugh

(57) ABSTRACT

A system and a method of displaying projected images on a projection screen of the system include one or more reconfigurable holographic optical elements (HOEs) in the screen to optically manipulate the projected images impinging on the screen. The reconfigurable HOEs may be configured to perform simple optical functions that are commonly associated with traditional optical devices, such as lenses, prisms and mirrors. However, the reconfigurable HOEs may also be configured to perform sophisticated optical manipulations, such as varying angular intensity of diffused light toward predefined viewing regions. Each reconfigurable HOE includes a hologram that is sandwiched between two electrode layers. The hologram is a holographic photopolymeric film that has been combined with liquid crystal. The hologram has an optical property that changes in response to an applied electrical field. The reconfigurable HOEs are utilized to control the diffusing characteristic of the projection screen. The diffusing characteristic can be changed by selectively setting one or more reconfigurable HOEs to a diffractive state. In one application, the reconfigurable HOEs are utilized to optimally diffuse the projected images with respect to light intensity, so that the projected images appear to be uniformly bright to multiple observers at different viewing regions. In another application, the reconfigurable HOEs are utilized to display the projected images in a stereoscopic form.

19 Claims, 9 Drawing Sheets

LIGHT DIFFUSION CONTROL BY ELECTRICALLY RECONFIGURABLE HOLOGRAPHIC OPTICAL ELEMENTS

This application claims the benefit of U.S. Provisional Application Ser. No. 60/104,471, filed Oct. 16, 1998.

TECHNICAL FIELD

The invention relates generally to projection systems and more particularly to a projection screen that utilizes a holographic optical element.

DESCRIPTION OF THE RELATED ART

Projection systems operate to display an image or a sequence of images by projecting the image(s) onto a screen. These systems tend to be designed for multiple viewers and usually require the projection screen to have a large viewing area to achieve large fields of view at comfortable viewing distances. The projected images vary in size, depending on the particular projection system. For example, projection systems that are used in theaters are able to display projected images that are extremely large, while projection systems that are used in offices for presentations are typically limited to much smaller projected images.

A significant disadvantage of the projection systems over other display systems is that the quality of the displayed image on a typical projection screen deteriorates as a viewer deviates further away from an axis normal to the center of the screen. This disadvantage can be illustrated by describing the image displaying operation of a standard projection system 10, shown in FIG. 1. The standard projection system includes a projector 12 and a projection screen 14. The projector 12 contains an image generator 16 and projection optics 18. The image generator operates to generate and project an input image onto the screen. The projection optics includes lenses (not shown) that magnify and/or focus the input image that is being projected to the screen. The projection screen is designed to display the projected input image by diffusing the input image in order for an observer 20 to view the displayed image. The light intensity of the displayed image viewed by the observer is largely dependent on the position of the observer from the center axis of the screen.

In FIG. 1, three light rays 22, 24 and 26 defining beam directions of the projected input image are shown to propagate from the projection optics 18 to the screen 14. The path of the light ray 24 is the center axis of the screen. When the light rays 22–26 travel through the screen, the light beams are diffused by the screen. The light rays 22–26 emanate from the screen at points 28, 30 and 32, respectively. The diffusion patterns of the light rays from these points are schematically illustrated by polar diagrams 34, 36 and 38. For each polar diagram, the light intensity from the emanating point on the screen depends on the viewing location of the observer 20. The highest intensity of light is in the original direction of the light rays 22–26, as represented by arrows 40, 42 and 44. The intensity of light decreases as the observer moves further away from the direction of the highest light intensity.

From the location of the observer 20, the light intensities from the points 28–32 on the screen 14 vary in accordance with the polar diagrams 34–38. The light intensities from the points 28–32, as viewed by the observer 20, are illustrated by arrows 46, 48 and 50 in the polar diagrams. The lengths of these arrows represent the light intensity from the various points on the screen, in which greater lengths equate to higher light intensity. As shown in FIG. 1, the light intensity from the point 32 toward the observer is low, as illustrated by the short length of the arrow 50. Therefore, the displayed image will appear dim at certain regions on the screen, such as the point 32.

One way to increase the light intensities from different points on the screen 14, as viewed from the location of the observer 20, is to modify the diffusing characteristic of the screen by including a holographic optical element (HOE) in the screen. An HOE is a hologram having recorded interference fringes to optically manipulate propagating light. Depending on the recording, the HOE is able to perform optical functions that are associated with traditional optical elements, such as lenses and prisms, as well as more sophisticated optical operations.

Turning to FIG. 2, the projection system 10 has been modified by replacing the screen 14 with an HOE 52 that functions as a projection screen. The HOE is holographically configured to cause the light beams 22, 24 and 26 to be diffused in a different diffusion pattern than the screen 14 of FIG. 1, as illustrated by polar diagrams 54, 56 and 58. As a result, the light intensities from the points 28–32 on the HOE 52 to the observer 20 are much higher that the light intensities from the same points on the screen 14, as indicated by arrows 60, 62 and 64. Therefore, the displayed image on the HOE will appear to be uniformly brighter to the observer 20 than the displayed image on the screen 14.

A concern with the projection system 10 of FIG. 2 is that at other viewing locations, the displayed image will again appear dim at certain regions on the HOE 52. In addition, the optical operation of the HOE 52 would need to function over the full visual bandwidth to display a color image, which would cause chromatic aberrations due to the intrinsically monochromatic nature of the holograms.

There are a number of U.S. patents that disclose holographic projection screens designed to correct chromatic aberrations. U.S. Pat. No. 5,046,793 to Hockley et al. describes a screen that is holographically configured to correct chromatic aberrations within predefined "eyeboxes." The holographic screen of Hockley et al. is fabricated by recording multiple holographic exposures for each eyebox. The recording creates interference fringes that correspond to the multiple exposures. These interference fringes collectively mix appropriate amounts of different color lights to color balance the resulting displayed image on the screen. A concern with the holographic screen of Hockley et al. is that the multiple exposure procedure results in separate holograms having a reduced diffraction efficiency. U.S. Pat. No. 5,796,499 to Wenyon describes a screen that is also holographically configured to correct chromatic aberrations. The holographic projection screen of Wenyon is designed to produce particular angular intensity distributions to chromatically balance diffused light for light beams having wavelengths of 400 nm to 700 nm and impinging at an incident angle of 0° to ±30° relative to normal incidence.

Although the conventional projection screens operate well for their intended purposes, what is needed is a projection screen having a controllable diffusing characteristic that can produce a color-balanced and intensity-consistent displayed image toward one or more optimal viewing regions.

SUMMARY OF THE INVENTION

A system and a method of displaying projected images on a projection screen of the system utilize one or more reconfigurable holographic optical elements (HOEs) in the screen to optically manipulate the projected images impinging on the screen. The reconfigurable HOEs may be designed to perform simple optical functions that are commonly associated with traditional optical devices, such as those performed by lenses, prisms and mirrors. However, the reconfigurable HOEs are also designed to perform sophisticated optical manipulations, such as varying angular intensity of diffused light toward predefined viewing regions. Depending on the optical characteristics of the reconfigurable HOEs, the projection screen of the system may be designed for "reflective viewing," i.e., viewing from the side of the projection screen facing a projector, or for "transmissive viewing," i.e., viewing from the side of the screen opposite to the projector.

Each reconfigurable HOE includes a hologram that is sandwiched between two electrode layers. The hologram is a holographic photopolymeric film that has been combined with liquid crystal. The presence of the liquid crystal allows the hologram to exhibit optical characteristics that are dependent on an applied electrical field. Preferably, the hologram is a Bragg-type hologram, having a high diffraction efficiency. The electrode layers may be made of Indium Tin Oxide (ITO), which typically has a transmission efficiency of greater than 80%.

The reconfigurable HOE has at least two optical operating states, a diffractive state and a passive state. The diffractive properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is generated in the hologram by applying voltage to the electrode layers of the reconfigurable HOE, the operating state of the hologram switches from the diffractive state to the passive state.

In a first embodiment of the invention, the system includes a projection screen having a stack of three reconfigurable HOEs. The stack of reconfigurable HOEs operates to diffuse light beams of an input image that are projected from a projector in a predefined diffusion pattern, such that diffused light of the projected image is directed with a relatively high intensity toward a specific viewing region. Thus, the reconfigurable HOE stack angularly varies the intensity of diffused light of the projected image, so that the projected image can be viewed by an observer within the viewing region as a generally uniformly bright image.

The three reconfigurable HOEs of the stack are holographically configured to produce the same predefined diffusion pattern. However, each reconfigurable HOE is also holographically designed to optically operate on a single monochromatic light of the tristimulus colors, i.e., red, blue and green. The reconfigurable HOEs are electrically coupled to a voltage controller that controls the optical state of the reconfigurable HOEs by selectively providing voltages to generate electrical fields within selected reconfigurable HOEs.

In operation, the projector sequentially generates and projects monochromatic images to the screen. A color image is displayed on the screen by sequentially displaying a color set of monochromatic images. The color set includes red, blue and green monochromatic images. In a cycle that is both temporally and chromatically synchronized with the sequenced projection of the three monochromatic images, the stack is electrically manipulated to establish a rotation in which one color-specific reconfigurable HOE of the stack is set to the diffractive state, while the other two color-specific reconfigurable HOEs are set to the passive state. The projected monochromatic images are sequentially diffused in the predefined diffusion pattern by the sequencing of the reconfigurable HOEs into the diffractive state. As a result, a uniformly bright color image is presented to an observer positioned at the specific viewing region.

In a second embodiment of the invention, the projection screen of the system includes a number of reconfigurable HOE stacks. Each reconfigurable HOE stack is holographically configured to produce a different diffusion pattern. In order to produce a specific diffusion pattern, one or more of the reconfigurable HOE stacks are selected to operate on the projected images. The unselected reconfigurable HOE stacks are set to be continuously passive and do not contribute to producing the specific diffusion pattern. The number of potential diffusion patterns that can be produced by the projection screen having N reconfigurable HOE stacks is two to the $N^{th}$ power. This number of potential diffusion patterns includes a pattern in which all the holograms are deactivated, so that there is no diffusion. In an alternative embodiment, the projection screen includes a passive (non-switchable) diffusing element which provides a base level diffusion when all the holograms are deactivated. Therefore, the number of specific diffusion patterns that can be produced by the projection screen can be increased significantly by including additional reconfigurable HOE stacks.

Similar to the operation of the projection screen in accordance with the first embodiment, the reconfigurable HOEs of the projection screen in accordance with the second embodiment operates to sequentially diffuse projected monochromatic images in order to display a color image on the screen. However, in the second embodiment, two or more reconfigurable HOEs may be simultaneously set to the diffractive state to diffuse a projected monochromatic image to produce the specific diffusion pattern. For each selected stack and at any given moment, a reconfigurable HOE that corresponds to the present color of the projected monochromatic image is set to the diffractive state. Therefore, more than one reconfigurable HOE will be set to the diffractive state if the number of selected stacks is equal to or greater than two.

As an exemplary system in accordance with the second embodiment, the projection screen includes two reconfigurable HOE stacks. One of the two reconfigurable HOE stacks is holographically configured to produce a first diffusion pattern to optimally direct projected images toward a first viewing region. The other reconfigurable HOE stack is holographically configured to produce a second diffusion pattern to optimally direct a displayed image toward a second viewing region. The optical characteristics of the reconfigurable HOE stacks allow the projection screen to simultaneously present high quality projected images to two observers positioned at different locations, the first and second viewing regions.

In one application, the same projected image is presented to both observers in an alternating fashion. In another application, different images are presented to the observers. This is accomplished by synchronizing the operation of the two reconfigurable HOE stacks with the generation and projection of two color sets of monochromatic images. A first color set of monochromatic images is presented to the observer in the first viewing region by one of the reconfigurable HOE stacks. A second color set of monochromatic images is presented to the observer in the second viewing region by the other reconfigurable HOE stack. The observers will see only the images that have been diffused to their respective viewing regions.

Therefore, each observer will see a different image on the screen.

The projection system may include one or more imaging devices that are operatively associated with the projection screen. The imaging devices operate to capture images of an observer to determine the general location of the observer. The determination of the observer's location is then utilized to select an appropriate reconfigurable HOE stack of the projection screen to optimally diffuse projected images toward the observer. Although the use of imaging devices is preferred, other location determining devices may instead be utilized, such as a radio-frequency radar device.

In a third embodiment of the invention, the projection screen includes at least two reconfigurable HOE stacks to provide autostereoscopic display. Each of the two reconfigurable HOE stacks is dedicated to diffusing projected images toward one of the eyes of an observer. By presenting different perspective images of a single scene to each eye of the observer, the scene is viewed by the observer in a stereoscopic form. The projection screen may include additional pairs of reconfigurable HOE stacks to accommodate more than one observer.

An advantage of the present invention is that the diffusing characteristic of the projection screen can be controlled by selecting one or more reconfigurable HOEs of the screen to diffuse projected images. This feature allows the same image or different images to be optimally directed with respect to light intensity to multiple observers positioned at different viewing regions. In addition, the controllable feature of the projection screen allows the projected images to be displayed on the screen in a stereoscopic form to one or more observers.

DETAILED DESCRIPTION

Figure 1:
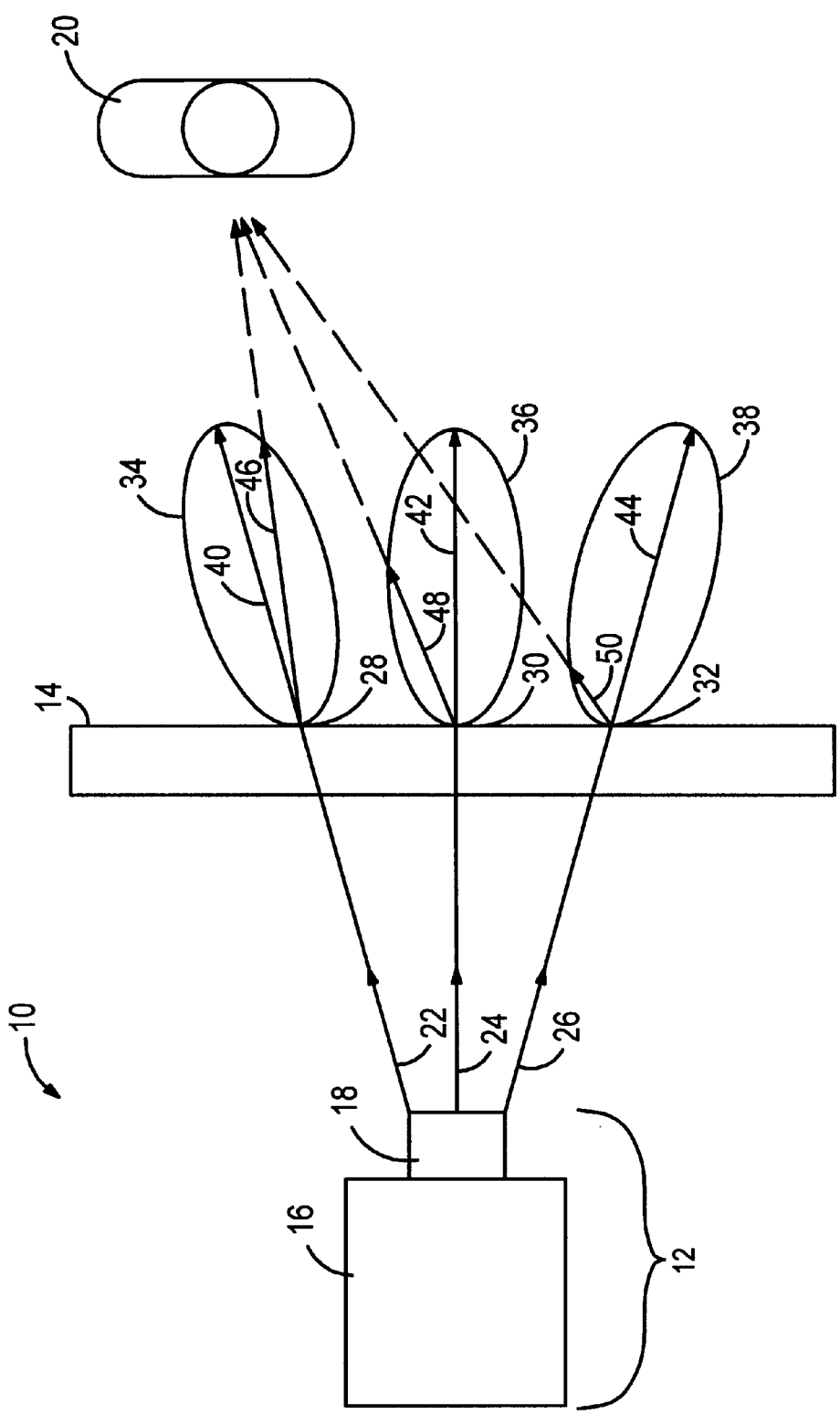
FIG. 1 is a schematic diagram of a prior art projection system having a projection screen with standard diffusing characteristics.
Figure 2:
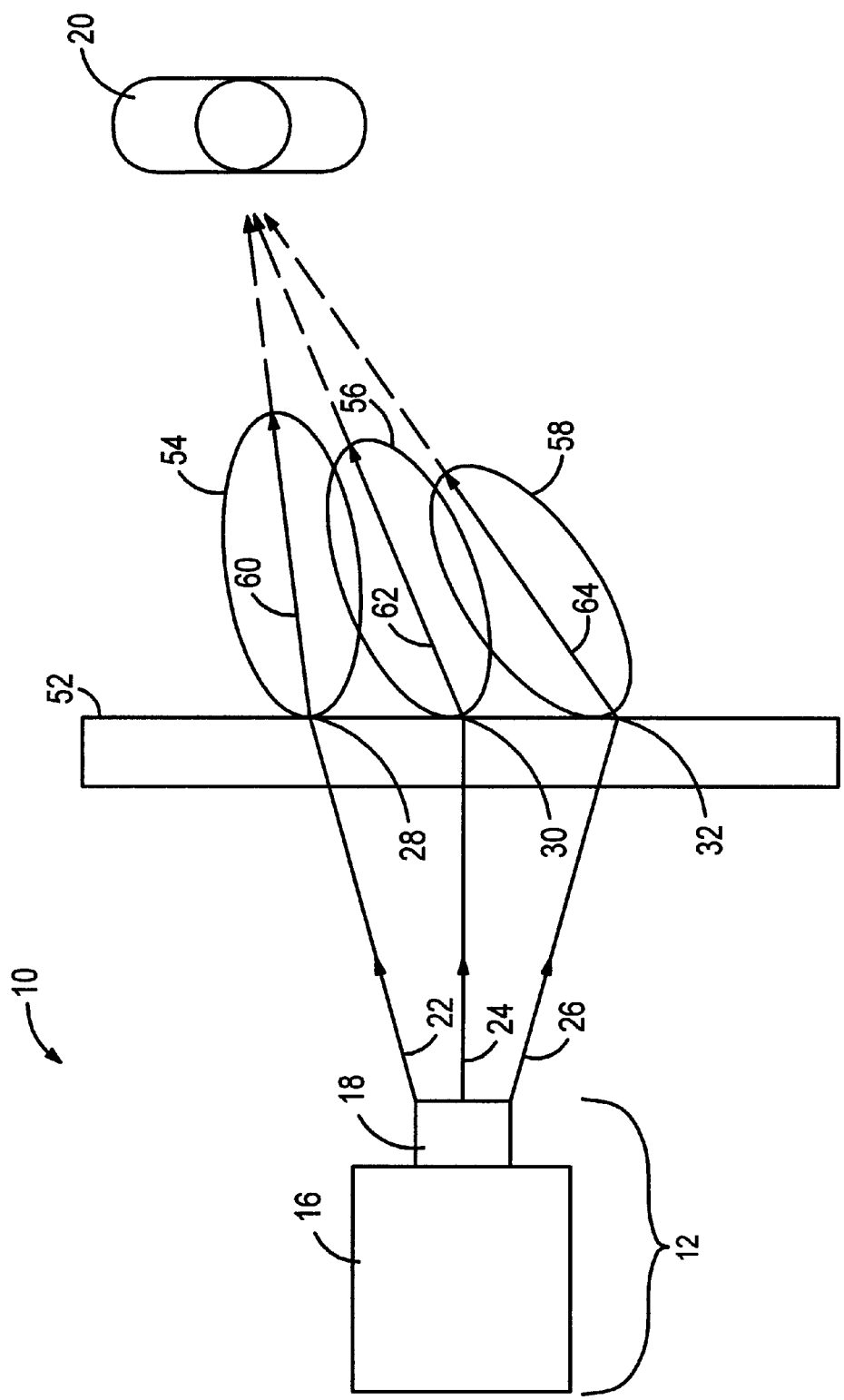
FIG. 2 is a schematic diagram of the prior art projection system of FIG. 1, wherein the projection screen includes a holographic optical element (HOE) with non-standard diffusing characteristics.
Figure 3:
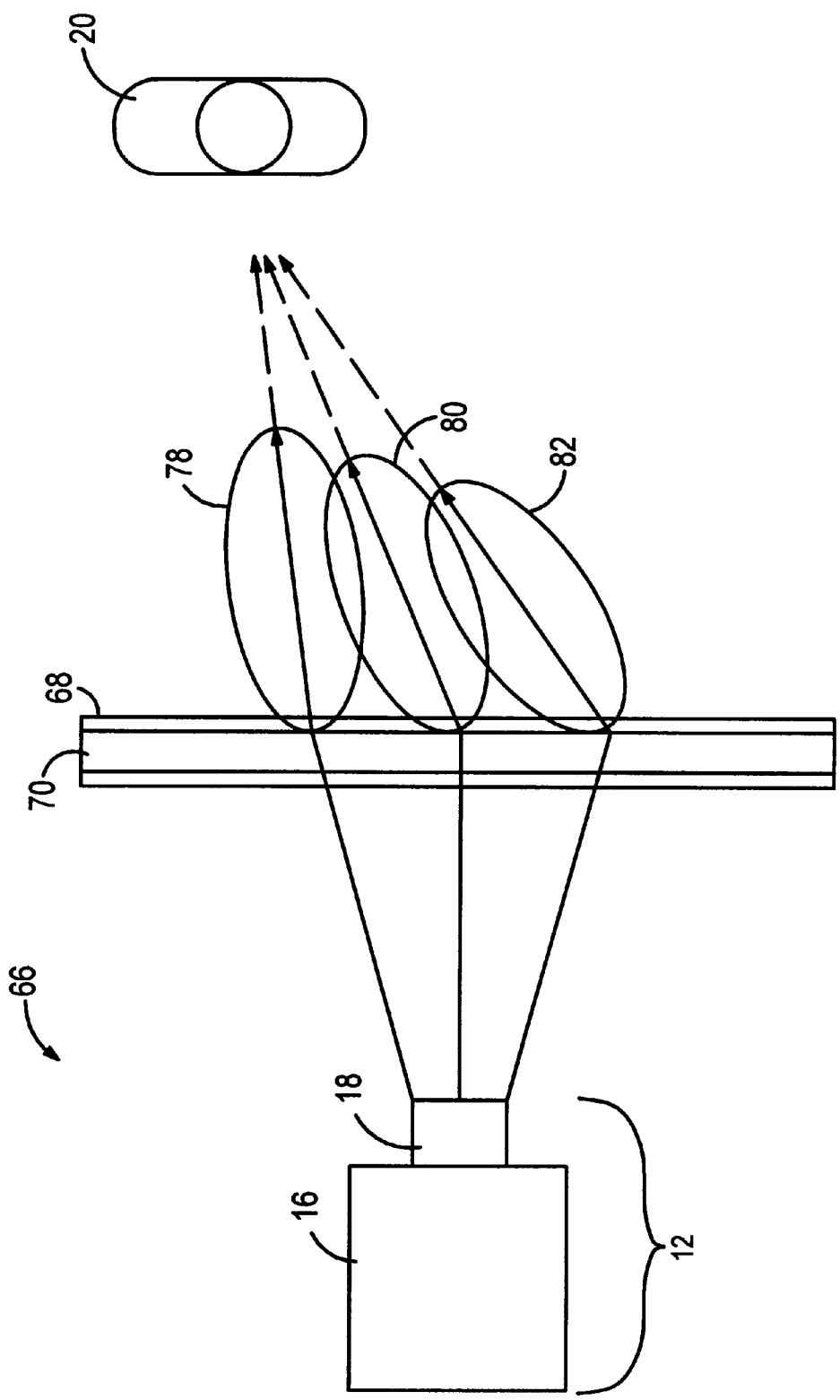
FIG. 3 is a schematic diagram of a projection system having a projection screen that includes a reconfigurable HOE stack in accordance with a first embodiment of the present invention.

With reference to FIG. 3, a projection system 66 in accordance with a first embodiment of the invention is shown. The same reference numerals of FIGS. 1 and 2 will be utilized for the same components depicted in FIG. 3. The projection system includes the projector 12 and a projection screen 68. The projector contains the image generator 16 and the projection optics 18. The screen includes what will be referred to as "reconfigurable holographic optical elements" (HOEs). Similar to conventional HOEs, these reconfigurable HOEs can perform functions typically associated with traditional optical elements, as well as more sophisticated optical manipulations. However, the reconfigurable HOEs can alter their optical properties in response to an applied electrical field.

The reconfigurable HOE includes a hologram that is sandwiched between two electrode layers. The hologram is preferably a Bragg-type hologram, having a high diffraction efficiency. The hologram is a holographic photopolymeric film that has been combined with liquid crystal. As an example, the photopolymeric film may be composed of a polymerizable monomer having dipentaerythritol hydroxypentacrylate, as described in PCT Application No. PCT/US97/12577 of Sutherland et al. The liquid crystal may be suffused into the pores of the photopolymeric film. The holographic fringes could be recorded into the photopolymeric film either prior to or after being combined with the liquid crystal. In the preferred embodiment, the photopolymeric material is combined with the liquid crystal prior to the recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the reconfigurable HOEs.

Recording of the hologram can be accomplished by a traditional optical process in which interference fringes are created by applying beams of light. Alternatively, the interference fringes may be artificially created by using highly accurate laser writing devices or other optical replication techniques. The electrode layers that are adjacent to the hologram are made of a transparent conductive material. As an example, the electrode layers may be made of Indium Tin Oxide (ITO), which usually has a transmission efficiency of greater than 80%. An electrical field is generated within the hologram when a potential difference is applied to the layers.

The reconfigurable HOE has at least two optically operating states, a diffractive state and a passive state. The optical properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is created in the hologram by applying voltage to the electrode layers of the reconfigurable HOE, the optical state of the hologram switches from the diffractive state to the passive state.

Figure 4:
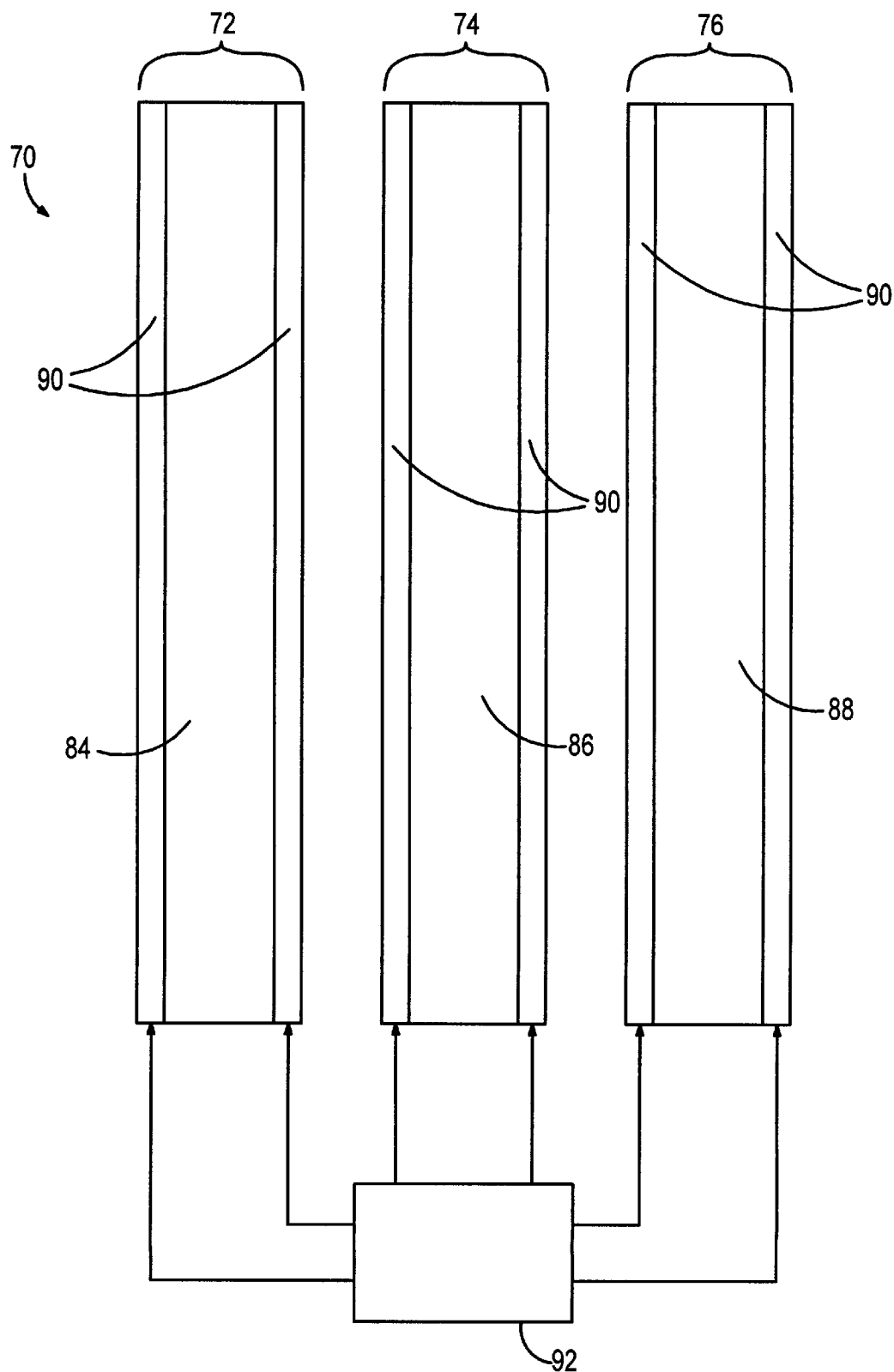
FIG. 4 is a schematic diagram of the components of the reconfigurable HOE stack of FIG. 3.

The projection screen 68 includes a reconfigurable HOE stack 70 that contains three reconfigurable HOEs 72, 74 and 76, shown in FIG. 4. The reconfigurable HOE stack operates to diffuse light beams of an input image projected from the image generator 16 in a particular diffusion pattern, such that diffused light of the input image is directed in high intensity toward the location of the observer 20. Thus, the reconfigurable HOE stack varies angular intensity of the diffused light of the input image being displayed on the screen, so that the displayed image can be viewed by the observer as a uniformly bright image. The diffusion pattern of the reconfigurable HOE stack is illustrated by polar diagrams 78, 80 and 82. These polar diagrams are similar to the polar diagrams 54–58 of FIG. 2, in that the light intensity from various points on the projection screen to the observer 20 is near maximum intensity.

The reconfigurable HOE 72 includes a hologram 84 that is sandwiched between two electrodes 90. Similarly, reconfigurable HOE 74 includes a hologram 86 that is also sandwiched between two electrodes 90, and the reconfigurable HOE 76 includes a hologram 88 between a pair of electrodes 90. Each hologram is holographically configured to have a diffusing characteristic that results in the diffusion patterns, as illustrated by the polar diagrams 78–82 of FIG. 3. However, each hologram is also configured such that only a particular monochromatic light is diffused by the hologram. The hologram 84 is holographically dedicated to operate on red light. The hologram 86 is configured to only operate on green light, while the hologram 88 is specific to blue light. The electrodes of the reconfigurable HOEs are individually coupled to a voltage controller 92. The voltage controller selectively provides an excitation signal to the electrodes of a selected reconfigurable HOE, switching the hologram of that reconfigurable HOE to the passive state.

In order to display a color image, the projection system 66 operates to sequentially display three monochromatic images of the color image, each monochromatic image corresponding to one of the tristimulus colors, i.e., red, green and blue. The monochromatic images are sequentially generated and projected to the projection screen 68 by the image generator 16. Each monochromatic image is projected from the image generator to the projection screen through the projection optics 18. The projection optics 18 focuses and magnifies the projected monochromatic images, so that the images can be displayed on the screen, focused and enlarged.

The projection screen 68 operates in conjunction with the image generator 16 to diffuse the projected monochromatic images in a diffusion pattern that provides high intensity of diffused lights toward the observer 20, as illustrated by the polar diagrams 78–82. During the period when the red monochromatic image is generated and projected, the voltage controller 92 switches the holograms 86 and 88 of the reconfigurable HOEs 74 and 76 from the diffractive state to the passive state by supplying voltages to the electrodes 90 of the reconfigurable HOEs 74 and 76. The supplied voltages to the electrodes of the reconfigurable HOE 74 create a potential difference between the electrodes, thereby generating an electrical field within the hologram 86. The presence of the generated electrical field switches the optical characteristic of the hologram 86 to the passive state. The hologram 88 of the reconfigurable HOE 76 is switched to the passive state in the same manner.

With the holograms 86 and 88 of the reconfigurable HOEs 74 and 76 switched to the passive state, only the hologram 84 of the reconfigurable HOE 72 is in the diffractive state to optically diffuse the projected red image. The reconfigurable HOE 72 diffuses light of the red image in the diffusion pattern that provides high intensity toward the observer 20. Thus, the displayed red image can be optimally viewed by the observer 20 with respect to light intensity.

During the period when the green monochromatic image is generated and projected, the voltage controller 92 switches the hologram 84 of the reconfigurable HOE 72 to the passive state by supplying voltage to the electrodes 90 of the reconfigurable HOE 72, thereby generating an electrical field within the holograms 84. The voltage to the electrodes of the reconfigurable HOE 74 is removed to switch the optical state of the reconfigurable HOE 74 to the diffractive state. However, the passive state of the reconfigurable HOE 76 is maintained by continuing to supply voltage to the electrodes of the reconfigurable HOE 76. Thus, only the reconfigurable HOE 74 is in the diffractive state. The reconfigurable HOE 74 diffuses light of the green image in the diffusion pattern that provides high intensity light toward the observer 20, as illustrated by the polar diagrams 78–82.

During the period when the blue monochromatic image is generated and projected, the voltage controller 92 switches the reconfigurable HOEs 74 to the passive state, switches the reconfigurable HOE 76 to the diffractive state, and maintains the passive state of the reconfigurable HOE 72. Thus, only the reconfigurable HOE 76 is in the diffractive state. The reconfigurable HOE 76 diffuses light of the blue image in the diffusion pattern that provides high light intensities toward the observer 20, as illustrated by the polar diagrams 78–82.

With a sufficient refresh rate, the sequential display of the monochromatic images allows the image on the projection screen 68 to appear to be in color. Since a single hologram operates on a particular monochromatic image, the issue of color aberration due to wavelength variations is virtually eliminated. Although the operation of the reconfigurable HOE stack 70 has been described in a particular order with respect to the tristimulus colors, the order in which the monochromatic images are projected and diffused is not critical to the invention.

The diffusion pattern of the reconfigurable HOEs 72–76 defines an "optimal region" where the displayed image on the screen 68 can be optimally viewed with respect to light intensity. In FIG. 3, the optimal region is approximately centered around the observer 20. The size of the optimal region is determined by the diffusing characteristic of the reconfigurable HOEs 72–76.

Figure 5:
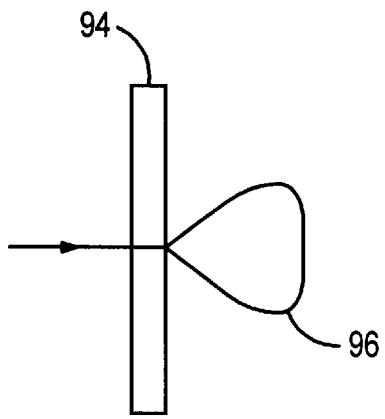
FIGS. 5–7 are schematic illustrations of a variety of diffusion patterns that can be produced by a reconfigurable HOE.
Figure 6:
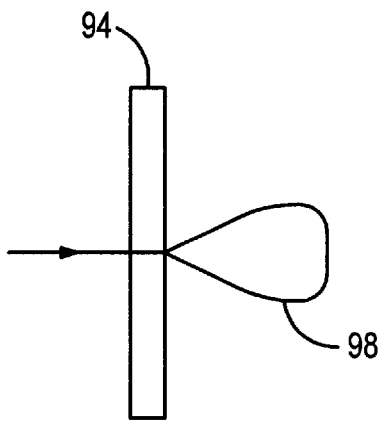
Figure 7:
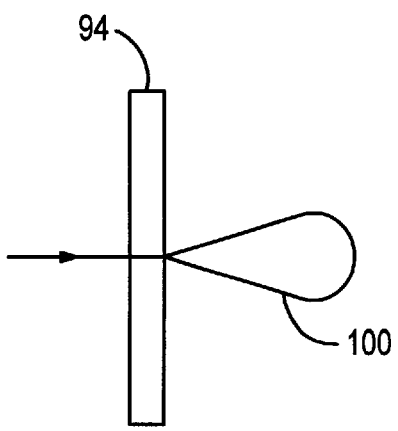

The reconfigurable HOEs 72–76 may be holographically configured to have an optical characteristic to yield a particular diffusion pattern from a variety of diffusion patterns, as shown in FIGS. 5, 6 and 7. In FIG. 5, a reconfigurable HOE 94 is designed to diffuse impinging light in a wide diffusion pattern, as illustrated by polar diagram 96. For simplification, the electrodes and the hologram of the reconfigurable HOE 94 are not shown. However, the reconfigurable HOE 94 can be formed to diffuse impinging light in narrower diffusion patterns, as illustrated by polar diagrams 98 and 100 in FIGS. 6 and 7. A wider diffusion pattern will create a larger optimal region. However, the maximum light intensity will be decreased, as the diffusion pattern is widened.

Figure 8:
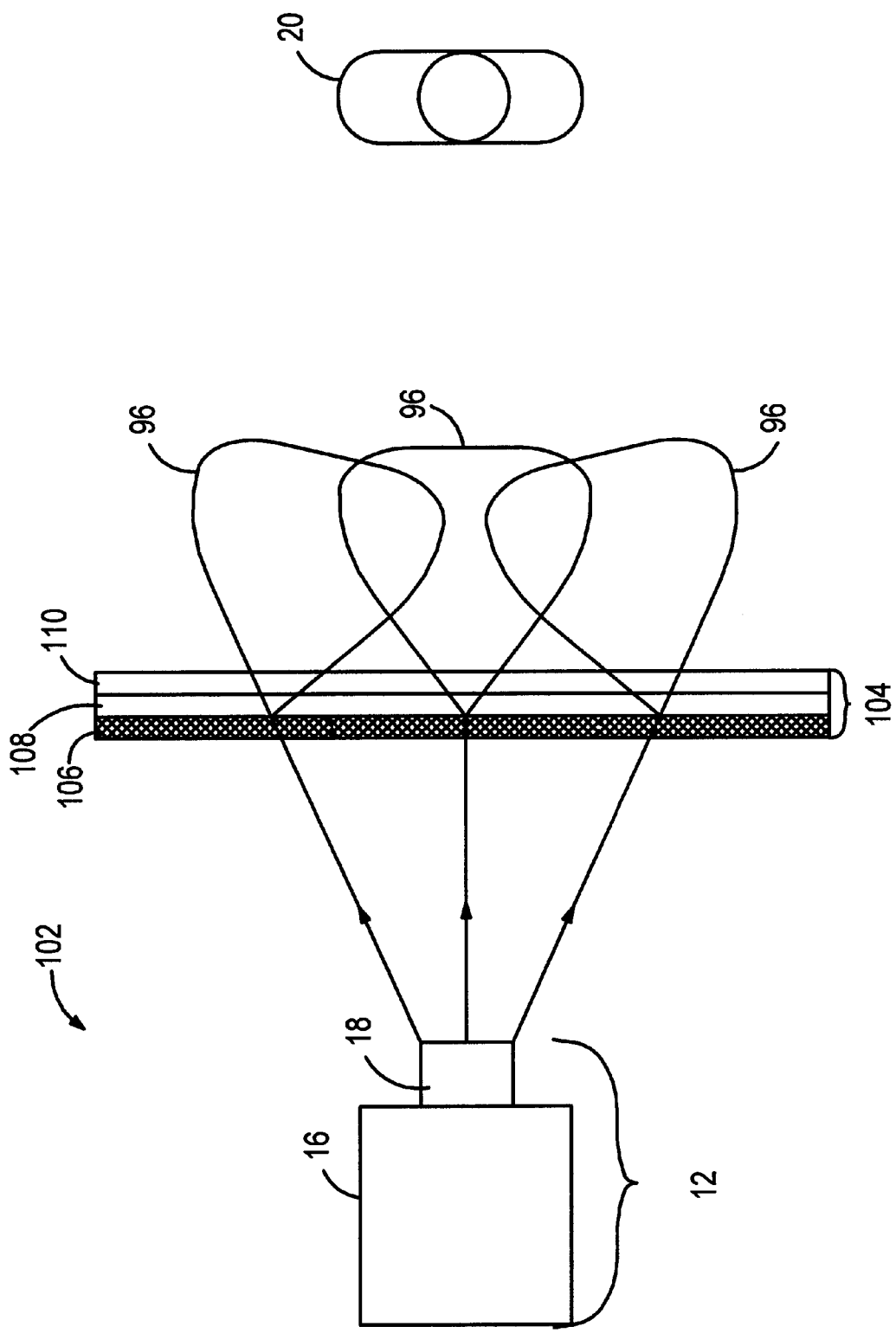
FIG. 8 is a schematic diagram of an exemplary projection system having a projection screen that includes three reconfigurable HOE stacks in accordance with a second embodiment of the invention.

Turning to FIG. 8, an exemplary projection system 102 in accordance with a second embodiment of the invention is shown. The same reference numerals of FIG. 3 will be used for the same components illustrated in FIG. 8. The projection system 102 includes the projector 12 and a projection screen 104. The projection screen contains more than one reconfigurable HOE stacks. The exact number of reconfigurable HOE stacks in the projection screen is not critical to the invention.

In FIG. 8, the projection screen 104 is shown with three reconfigurable HOE stacks 106, 108 and 110. Identical to the reconfigurable HOE stack 70, each of the stacks 106–110 includes three reconfigurable HOEs that are holographically configured to be wavelength selective, so that each of the HOEs optically diffuses only the projected images of a particular color. Furthermore, the reconfigurable HOEs in each of the stacks 106–110 are configured to have a common diffusing characteristic that produces a specific diffusion pattern. The reconfigurable HOEs of the stack 106 are holographically configured to produce the diffusion pattern shown in FIG. 5, as illustrated by the polar diagram 96. The reconfigurable HOEs of the stack 108 are holographically configured to produce the diffusion pattern shown in FIG. 6, as illustrated by the polar diagram 98, while the reconfigurable HOEs of the stack 110 are configured to produce the diffusion pattern shown in FIG. 7, as illustrated by the polar diagrams 100.

In operation, only one of the reconfigurable HOE stacks 106–110 is selected to diffuse the monochromatic images projected from the image generator 16 in a particular diffusion pattern. For example, if the diffusion pattern of FIG. 5 is chosen, the reconfigurable HOE stack 106 is selected to diffuse the projected images, as shown in FIG. 8. In FIG. 8, the reconfigurable HOE stack 106 is illustrated with cross-hatching to indicate that the reconfigurable HOE stack 106 has been selected. The unselected reconfigurable HOE stacks 108 and 110 are set to the passive state. After the selection of the reconfigurable HOE stack 106, the projection system 102 operates in a manner identical to the projection system 66 of FIG. 3. The image generator 16 sequentially generates and projects monochromatic images to the screen 104 through the projection optics 18. In synchronization with the sequential generation and projection of the monochromatic images, each of the reconfigurable HOEs of the stack 106 is selectively switched to either the diffractive state or the passive state to diffuse the monochromatic images, thereby displaying a color image on the screen 104.

Similarly, if the diffusion pattern of FIG. 6 is chosen, the reconfigurable HOE stack 108 is selected to sequentially diffuse the projected monochromatic images to produce the chosen diffusion pattern. The unselected stacks 106 and 110 are set to the passive state. The diffusion pattern of FIG. 7 can be produced in the same manner by selecting the stack 110 and setting the stacks 106 and 108 to the passive state. Therefore, the projection screen 104 is able to produce any one of the three diffusion patterns of FIGS. 5–7.

In a more complex embodiment, the projection screen 104 is enabled to produce composite diffusion patterns by selecting more than one reconfigurable HOE stack 106–110 to diffuse the projected monochromatic images. For example, the stacks 106 and 108 may be selected to produce a diffusion pattern that is unlike the diffusion patterns of FIGS. 5 and 6. In this embodiment, two reconfigurable HOEs, one from each of the stacks 106 and 108, are simultaneously set to the diffractive state to collectively diffuse a projected monochromatic image. The two reconfigurable HOEs set to the diffractive state are both holographically configured to diffract monochromatic images of a particular color. In this manner, a pair of reconfigurable HOEs from the stacks 106 and 108 are simultaneously activated to the diffractive state to diffuse the sequentially projected monochromatic images. In this embodiment, the projection screen 104 is able to produce one of eight different diffusion patterns. The number of potential diffusion patterns that can be produced by a similar projection screen having N reconfigurable HOE stacks is two to the $N^{th}$ power. This number of potential diffusion patterns includes a pattern in which all the holograms are deactivated, so that there is no diffusion. In an alternative embodiment, the projection screen includes a passive (non-switchable) diffusing element which provides a base level diffusion when all the holograms are deactivated. Therefore, the number of different diffusion patterns that can be produced by the projection screen 104 can be increased by including additional reconfigurable HOE stacks.

Figure 9:
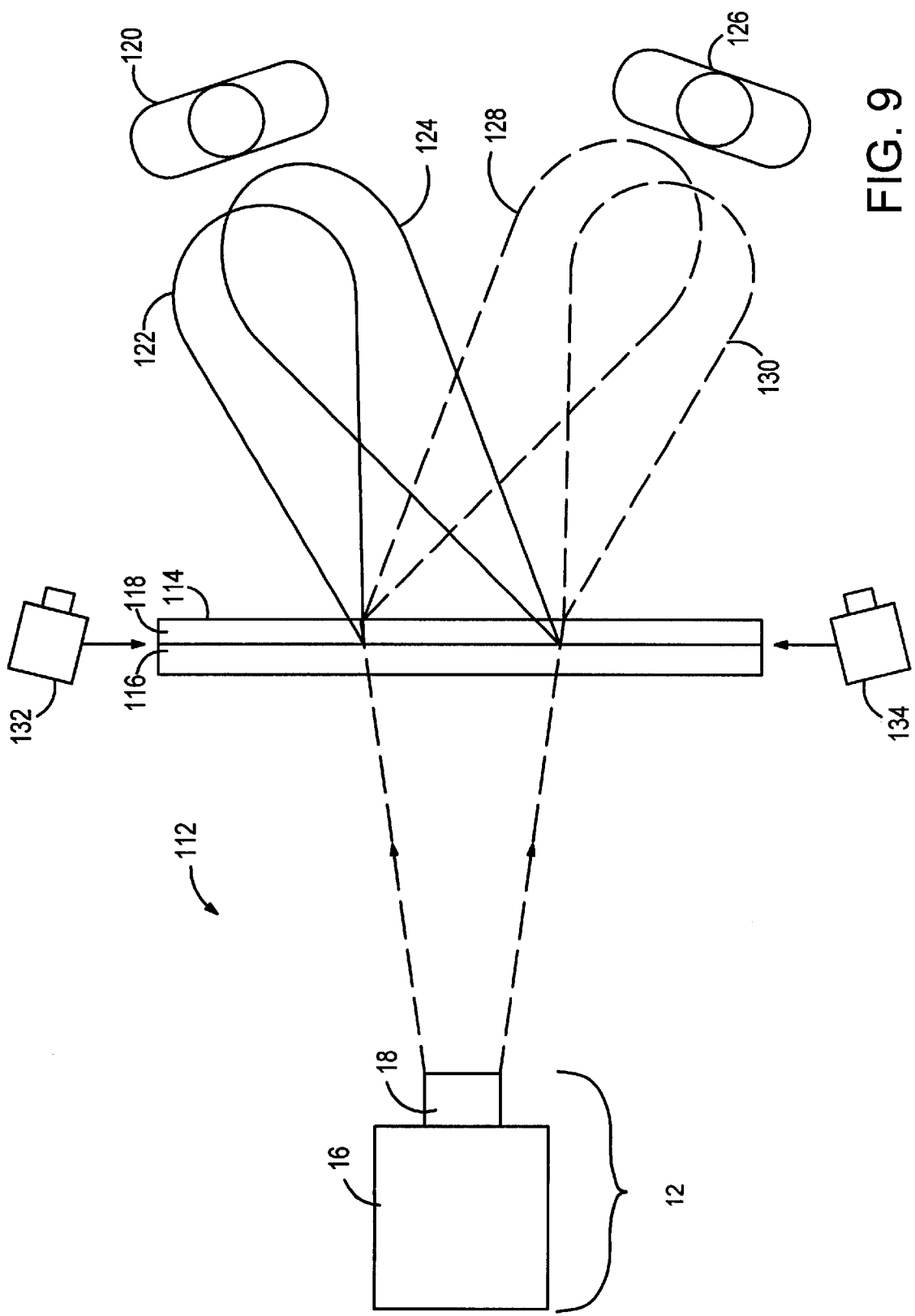
FIG. 9 is a schematic diagram of a projection system in accordance with the invention.

In FIG. 9, a projection system 112 in accordance with a third embodiment of the invention is shown. The projection system includes the projector 12 and a projection screen 114 having at least two reconfigurable HOE stacks 116 and 118. Identical to the reconfigurable HOE stacks 70, 106, 108 and 110, each of the stacks 116 and 118 includes three reconfigurable HOEs that are wavelength selective to diffuse monochromatic images of particular colors projected from the image generator 16.

The reconfigurable HOE stacks 116 and 118 are designed to diffuse the projected images in a specific diffusion pattern when in the diffractive state. The reconfigurable HOE stack 116 has an optical characteristic to produce a first diffusion pattern to direct a displayed image toward the location of an observer 120, as illustrated by polar diagrams 122 and 124. However, the reconfigurable HOE stack 118 has an optical characteristic to produce a second diffusion pattern to direct a displayed image toward the location of an observer 126, as illustrated by polar diagrams 128 and 130. The first and second diffusion patterns allow the observers that are positioned at different viewing regions to view a more uniformly bright image displayed on the screen 114.

In operation, the reconfigurable HOE stacks 116 and 118 of the screen 114 optically operate on a color set of projected monochromatic images from the projector 12 in an alternating fashion. When the reconfigurable HOE stack 116 is operating on a color set of projected images, the reconfigurable HOEs of the stack 116 are sequentially set to the diffractive state to optically manipulate the projected images, so that a color image is presented to the observer 120. When the reconfigurable HOE stack 118 is operating on a color set of projected images, the reconfigurable HOEs of the stack 118 are sequentially set to the diffractive state to optically manipulate the projected images, so that a color image is presented to the observer 126. The alternating operation of the of the reconfigurable HOE stacks 116 and 118 allows both observers to see a uniformly bright color image displayed on the screen.

In one application, the same color image is presented to both observers 120 and 126. In a more complex application, different color images are presented to the observers. This is accomplished by generating a color set of projected images for the first color image when one of the reconfigurable HOE stacks 116 and 118 is operating and then generating a different color set of projected images for the second color image when the other reconfigurable HOE stack is operating. The diffusion patterns of the reconfigurable HOE stacks permit only the observer positioned at a specific viewing region to view the color image associated with the operating reconfigurable HOE stack. The observer 120 will see only the color image that has been diffused by the reconfigurable HOE stack 116, while the observer 126 will see only the other color image that has been diffused by the reconfigurable HOE stack 118.

The projection system 112 may include one or more imaging devices 132 and 134 that are operatively associated with the projection screen 114. The imaging devices operate to capture images of a viewer, such as the observers 120 and 126, to determine the general location of the viewer. The determination of the general location is then utilized to select one or more reconfigurable HOE stacks 116 and 118 of the screen to diffuse projected images to the viewer. For example, if only the observer 120 is present in the vicinity of the projection system, the imaging devices would capture one or more images of the observer 120 and determine the observer's general location. The determination of the observer's location may be calculated using known image processing methods. After the general location of the observer 120 has been determined, the reconfigurable HOE stack of the screen that will optimally direct the projected images toward that location is selected to diffuse the projected images. The unselected reconfigurable HOE stack will be set to the passive state. In the example, the selected reconfigurable HOE stack would be the reconfigurable HOE stack 116. Although the use of imaging devices is preferred, other location determining devices may instead be utilized, such as a radio-frequency radar device.

In a more complex arrangement, the projection screen 114 may include additional reconfigurable HOE stacks that are designed to produce diffusion patterns to optimally direct projected images toward different locations. By increasing the number of reconfigurable HOE stacks in the projection screen, more observers can optimally view the images that are displayed on the screen. With the increased number of reconfigurable HOE stacks, the imaging devices 132 and 134 could operate to select more than one reconfigurable HOE stack of the screen, depending on the number and locations of observers in the vicinity of the projection system 112. The number of reconfigurable HOE stacks in the projection screen is not critical to the invention.

Figure 10:
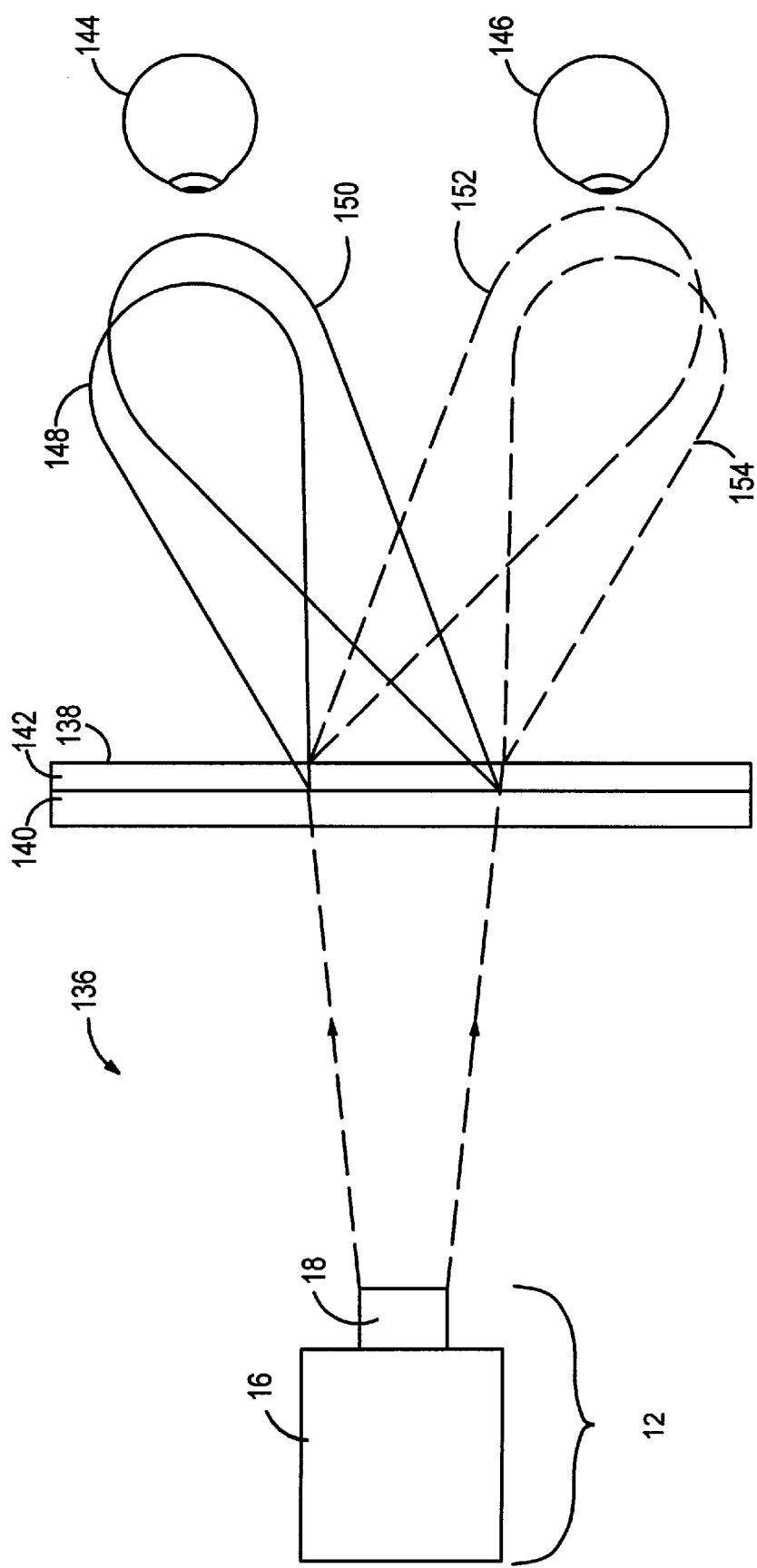
FIG. 10 is a schematic diagram of a projection system in accordance with another embodiment of the invention.

Turning to FIG. 10, a projection system 136 in accordance with a fourth embodiment of the invention is shown. The projection system includes the projector 12 and a projection screen 138 having at least a pair of reconfigurable HOE stacks 140 and 142. Identical to the previously-described reconfigurable HOE stacks, each of the stacks 140 and 142 includes three reconfigurable HOEs that are wavelength selective.

Similar to the reconfigurable HOE stacks 116 and 118 of the projection system 112 in FIG. 9, the reconfigurable HOE stacks 140 and 142 are formed to diffuse the projected images in specific diffusion patterns when in the diffractive state. However, the reconfigurable HOE stacks 140 and 142 are designed to selectively direct the projected images toward the eyes 144 and 146 of a single observer, instead of multiple observers. The reconfigurable HOE stack 140 has an optical characteristic to produce a first diffusion pattern to optimally direct the projected images toward the eye 144, as illustrated by polar diagrams 148 and 150. The reconfigurable HOE stack 142 has an optical characteristic to produce a second diffusion pattern to optimally direct the projected images toward the eye 146, as illustrated by polar diagrams 152 and 154. The first and second diffusion patterns allow the single observer to view the displayed image on the screen in a stereoscopic form without the use of a special viewing device. Thus, the projection system is an autostereoscopic display system.

In operation, the reconfigurable HOE stacks 140 and 142 optically operate on projected images in the same alternating fashion as the reconfigurable HOE stacks 116 and 118 of the projection system 112. When the reconfigurable HOE stack 140 is operating on a first color set of projected images, the reconfigurable HOEs of the stack 140 are sequentially set to the diffractive state to diffuse the projected images, such that a first color image is presented to the right eye 144. In the next sequence, the reconfigurable HOEs of the stack 142 are sequentially set to the diffractive state to diffuse the next color set of projected images, such that a second color image is presented to the left eye 146. The first and second color images are images that depict a single scene from slightly different perspectives. When superimposed, the first and second color images present a three-dimensional view of the scene. Therefore, the reconfigurable HOE stacks 140 and 142 enable the projection screen 138 to function as an autostereoscopic screen.

The projection screen 138 may be modified to accommodate additional observers. For each additional observer, the projection screen may be modified by including a pair of additional reconfigurable HOE stacks. Each new pair would include stacks that are separately dedicated to the two eyes of a particular additional observer in order to provide an autostereoscopic display. For multiple observers, the reconfigurable HOE stacks of the screen are individually selected in a sequential manner to present stereoscopic color images to all of the observers.

In a different application, the additional pairs of reconfigurable HOE stacks allow the projection screen 138 to selectively present stereoscopic images to observers who are positioned at different locations. The locations of the observers can be determined by incorporating a feedback loop between imaging devices (such as the imaging devices 132 and 134 of FIG. 9) and a voltage controller for activating the reconfigurable HOE stacks of the projection system 136. The imaging devices operate to determine the locations of the observers that are in a predetermined vicinity of the projection system 136. The determination of the observers' locations allows the projection system 136 to activate only the reconfigurable HOE stacks of the screen that can optimally direct the projected images toward the locations of the observers.

Although the projection screens 68, 104, 114 and 138 have been described as being designed for "transmissive viewing," i.e., viewing from the side of the screen opposite to the projector, these projection screens may also be designed for "reflective viewing," i.e., viewing from the side of the projection screen facing the projector. For reflective viewing, the holograms of reconfigurable HOEs in the projection screen are holographically produced to be reflection holograms. However, the switching operation of the reconfigurable HOEs in the projection screens is performed in the same manner for both types of screens.

Figure 11:
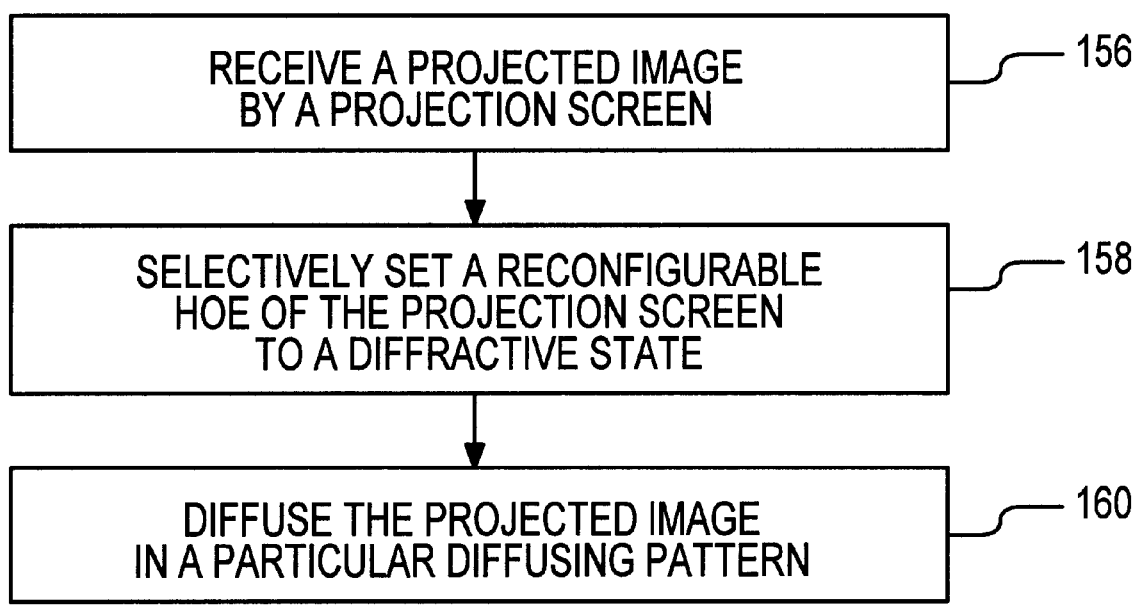
FIG. 11 is a flow diagram of a method of displaying projected images on a projection screen in accordance with the invention.

A method of displaying projected images on a projection screen in accordance with the present invention will be described with reference to FIG. 11. At step 156, a projected image is received by the screen. The projected image is preferably a monochromatic image that corresponds to one of the tristimulus colors. Next, at step 158, a reconfigurable HOE of the screen is selectively set to a diffractive state. In one embodiment, the selected reconfigurable HOE is the only reconfigurable HOE that is set to the diffractive state. In another embodiment, the selected reconfigurable HOE is only one of several reconfigurable HOEs that are set to the diffractive state. The order of steps 156 and 158 is not critical to the invention. At step 160, the projected image is diffused by the selected reconfigurable HOE of the screen in a diffusion pattern that is at least partially defined by an optical characteristic of the selected reconfigurable HOE. Preferably, the diffusion pattern optimally directs diffused light of the projected image toward a predefined viewing region with respect to the intensity of the diffused light.

What is claimed is:
1. A projection system comprising:
   image-generating means for optically projecting an input image in a predetermined direction; and display means positioned relative to said image-generating means to receive said input image for visually displaying said input image, said display means including a reconfigurable holographic optical element having holographically recorded interference fringes to optically manipulate said input image being displayed on said display means, said reconfigurable holographic optical element having a controllable optical characteristic that is responsive to an applied electrical field, said reconfigurable holographic optical element being holographically configured to diffuse said input image displayed on said display means in a first diffusion pattern when in a diffractive state.

2. The system of claim 1 wherein said display means further includes a second reconfigurable holographic optical element, said second reconfigurable holographic optical element being holographically configured to diffuse said input image in a second diffusion pattern when said second reconfigurable holographic optical element is in said diffractive state.

3. The system of claim 2 further comprising a voltage controller electrically coupled to said first and second reconfigurable holographic optical elements, said voltage controller being enabled to selectively supply voltages to said first and second reconfigurable holographic optical elements to set one or both of said first and second reconfigurable holographic optical elements to said diffractive state.

4. The system of claim 1 further comprising a variable voltage provider electrically coupled to said reconfigurable holographic optical element to supply varying voltages to said reconfigurable holographic optical element, said varying voltages affecting the strength of said applied electrical field to control said first diffusion pattern produced by said reconfigurable holographic optical elements.

5. The system of claim 1 wherein said reconfigurable holographic optical element is holographically configured to vary angular intensity of diffused light of said input image such that maximum light intensity of said input image being displayed is generally directed toward an optimal viewing region when in said diffractive state.

6. The system of claim 5 wherein said display means further includes a second reconfigurable holographic optical element, said second reconfigurable holographic optical element being holographically configured to vary said angular intensity of said diffused light of said input image such that said maximum light intensity of said input image being displayed is generally directed toward a second optimal viewing region when said second reconfigurable holographic optical element is in said diffractive state.

7. The system of claim 6 further comprising a viewer imaging means for determining locations of viewers, said viewer imaging means being operatively coupled to said first and second reconfigurable holographic optical elements to selectively enable at least one of said first and second reconfigurable holographic optical elements to said diffractive state in response to said determination.

8. The system of claim 1 wherein said reconfigurable holographic optical element is one of three reconfigurable holographical optical elements, each of said three reconfigurable holographic optical elements being holographically configured to optically manipulate one of tristimulus color lights when in said diffractive state to display a color image on said display means.

9. A method of displaying images on a display screen of a projection system comprising steps of:
receiving a projected image by said display screen; and
diffusing said projected image in a particular diffusion pattern to display said image on said display screen, including transmitting said projected image through a first reconfigurable holographic optical element of said display screen, said particular diffusion pattern being at least partially defined by an optical characteristic of said first reconfigurable holographic optical element, said optical characteristic being controllable by an applied electrical field.

10. The method of claim 9 wherein said step of diffusing said projected image in said particular diffusion pattern includes varying angular intensity of diffused light of said projected image toward a predefined viewing region.

11. The method of claim 10 further comprising steps of:
receiving a second projected image by said display screen; and
diffusing said second projected image in a different diffusion pattern than said particular diffusion pattern by transmitting said second projected image through a second reconfigurable holographic optical element of said display screen, including varying said angular intensity of diffused light of said second projected image toward a second predefined viewing region, said second reconfigurable holographic optical element having an optical characteristic that is controllable by a second applied electrical field.

12. The method of claim 9 wherein said step of diffusing said projected image in said particular diffusion pattern includes transmitting said projected image through a second reconfigurable holographic optical element, said particular diffusion pattern being a product of at least combined optical characteristics of said first and second reconfigurable holographic optical elements.

13. The method of claim 9 further comprising a step of selecting said first reconfigurable holographic optical element from a plurality of reconfigurable holographic optical elements of said display screen, including setting said first reconfigurable holographic optical element to a diffractive state to diffuse said projected image.

14. The method of claim 13 further comprising a step of determining a location of an observer in a predefined vicinity of said display screen, said determination being a factor for said selection of said first reconfigurable holographic optical element from said plurality of said reconfigurable holographic optical elements.

15. A projection system comprising:
an image generator that projects an input image in a predetermined direction; and
a display screen positioned to receive said input image projected from said image generator, said display screen including a first reconfigurable holographic optical element having holographically recorded interference fringes to diffuse said input image being displayed on said screen, said first reconfigurable holographic optical element having a first diffusing characteristic that is controllable by an applied electrical field.

16. The system of claim 15 wherein said display screen includes a second reconfigurable holographic optical element, said second reconfigurable holographic optical element having a second diffusing characteristic when said second reconfigurable holographic optical element is in a diffractive state.

17. The system of claim 16 further comprising a voltage controller electrically coupled to said first and second reconfigurable holographic optical elements, said voltage controller being enabled to selectively supply voltages to said first and second reconfigurable holographic optical elements to set one or both of said first and second reconfigurable holographic optical elements to said diffractive state.

18. The system of claim 16 wherein said first reconfigurable holographic optical element is holographically configured to vary angular intensity of diffused light of said input image toward a first viewing region when in said diffractive state, and wherein said second reconfigurable holographic optical element is holographically configured to vary said angular intensity of said diffused light of said input image toward a second viewing region when in said diffractive state.

19. The system of claim 15 further comprising a variable voltage provider electrically coupled to said first reconfigurable holographic optical element to supply varying voltages to said first reconfigurable holographic optical element, said varying voltages affecting the strength of said applied electrical field to control said first diffusing characteristic of said first reconfigurable holographic optical element.

* * * * *